US012511499B2

(12) United States Patent
Stone et al.

(10) Patent No.: US 12,511,499 B2
(45) Date of Patent: Dec. 30, 2025

(54) PHOTOREALISTIC TEXT INPAINTING FOR AUGMENTED REALITY USING GENERATIVE MODELS

(71) Applicant: Google LLC, Mountain View, CA (US)

(72) Inventors: Thomas Jonathan Stone, Zurich (CH); Darkhan Zholmukhanov, Adliswil (CH); Dawid Michal Wegner, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 541 days.

(21) Appl. No.: 17/953,710

(22) Filed: Sep. 27, 2022

(65) Prior Publication Data

US 2024/0104312 A1  Mar. 28, 2024

(51) Int. Cl.
*G06K 19/06* (2006.01)
*G06F 40/58* (2020.01)
*G06N 3/045* (2023.01)
*G06T 19/00* (2011.01)

(52) U.S. Cl.
CPC .............. *G06F 40/58* (2020.01); *G06N 3/045* (2023.01); *G06T 19/006* (2013.01)

(58) Field of Classification Search
CPC ............ H04M 3/5315; H04M 1/72439; G06V 20/62; G06V 30/142; G06V 20/20; G06T 11/001; G06T 5/77; G06T 5/60; G06T 19/006; G06T 2207/30176; G06T 2207/20084; G06F 40/58; G06F 16/285
USPC ............................................................ 704/2
See application file for complete search history.

(56) References Cited

U.S. PATENT DOCUMENTS

2014/0188889 A1* 7/2014 Martens ................ G06F 16/285
707/740

FOREIGN PATENT DOCUMENTS

JP        2016066360 A  *  4/2016   ............... G06K 9/00

OTHER PUBLICATIONS

International Search Report and Written Opinion for Application No. PCT/US2023/000438, mailed Jan. 30, 2024, 12 pages.
(Continued)

*Primary Examiner* — Md S Elahee
(74) *Attorney, Agent, or Firm* — DORITY & MANNING P.A.

(57) ABSTRACT

Provided are systems and methods that use generative models (e.g., generative adversarial networks) to enable photorealistic text inpainting in augmented reality. One example application of the proposed systems is to perform augmented reality translation. For example, a user can operate an image capture device (e.g., camera, smartphone, etc.) to capture imagery of a real-world scene that includes real-world text (e.g., signage, restaurant menus, etc.). The real-world text can be translated into a different language. Further, the captured imagery can be processed with a machine-learned generative model to produce an augmented image. The augmented image can depict the real-world scene with the real-world text removed. Specifically, because a machine-learned generative model is used, the augmented image can appear significantly more realistic, for example versus an image in which the real-world text has simply been blocked using a box with a single color.

20 Claims, 8 Drawing Sheets

(56) References Cited

OTHER PUBLICATIONS

Parhizkar et al., "Ubiquitous Mobile Real Time Visual Translator Using Augmented Reality for Bahasa Language.", International Journal of Information and Education Technology, Apr. 1, 2013, 6 pages or pp. 124-128.
Zhang et al., "Ensnet: Ensconce Text in the Wild", arXiv:1812.00723v1, dated Dec. 3, 2018, 8 pages.
Goodfellow et al., "Generative Adversarial Nets", arXiv:1406.2661v1, Jun. 10, 2014, 9 pages.
Howard et al., "MobileNets: Efficient Convolutional Neural Networks for Mobile Vision Applications", arXiv:1704.04861v1, Apr. 17, 2017, 9 pages.
Isola et al., "Image-to-Image Translation with Conditional Adversarial Networks", arXiv:1611.07004v3, Nov. 26, 2018, 17 pages.
Johnson et al., "Perceptual Losses for Real-Time Style Transfer and Super-Resolution", arXiv:1603.08155v1, Mar. 27, 2016, 18 pages.
Sandler et al., "MobileNetV2; Inverted Residuals and Linear Bottlenecks", arXiv:1801.04381v4, Mar. 21, 2019, 14 pages.
International Preliminary Report on Patentability for Application No. PCT/IB2023/000438, mailed Apr. 10, 2025, 7 pages.

\* cited by examiner

- PARAGRAPH 6
    - LINE 0
        - INPUT LINE: UNPADDED 354 x 30
        - INPUT LINE: PADDED 363 x 40
        - INPUT LINE CHUNKS 160 x 40    160 x 40    160 x 40
        - OUTPUT LINE CHUNKS 160 x 40    160 x 40    160 x 40
        - OUTPUT LINE: UNPADDED 354 x 30
        - OUTPUT LINE: PADDED 363 x 40

PHOTOREALISTIC TEXT INPAINTING FOR AUGMENTED REALITY USING GENERATIVE MODELS

FIELD

The present disclosure relates generally to augmented reality. More particularly, the present disclosure relates to the use of generative models to enable photorealistic text inpainting in augmented reality.

BACKGROUND

Augmented reality can refer to an interactive experience of a real-world environment where the objects that reside in the real world are enhanced or modified by computer-generated perceptual information such as computer-generated visualizations or graphics.

One example application of augmented reality relates the translation of text in an augmented reality experience. Specifically, a user can operate an image capture device (e.g., camera, smartphone, etc.) to capture imagery of a real-world scene that includes real-world text (e.g., signage, restaurant menus, etc.). The real-world text can be translated into a different language. An alternative image can be generated in which the translated text is shown in place of the real-world text. The alternative image can be displayed to the user (e.g., on a display screen of the smartphone).

However, in various systems which perform the example application given above, the alternative imagery may be difficult to read, unrealistic, or otherwise unnatural feeling to the user, resulting in a loss or lack of an immersive feeling for the user within the augmented reality experience.

As one example, certain existing systems may simply overlay the translated text over the raw image. This can result in difficulty reading the translated text. In other systems, the real-world text may be detected and then covered or blocked with a covering box of a single background color. However, the use of a blocking box with a uniform color again reduces the immersive feeling of the augmented reality experience.

Further, these systems often rely on simple text detection and blocking algorithms, and therefore fail or otherwise demonstrate inconsistency when applied to an augmented reality setting with inconsistent camera pose, lighting, or other dynamic changes to the scene.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform augmented reality translation. The method includes receiving, by a computing system comprising one or more computing devices, an input image, wherein the input image depicts a real-world scene that includes real-world text at a text location. The method includes processing, by the computing system, at least a portion of the input image with a machine-learned generative model to generate an augmented image, wherein the augmented image depicts the real-world scene with the real-world text removed. The method includes obtaining, by the computing system, translated text, wherein the translated text corresponds a translation of the real-world text into a different language. The method includes generating, by the computing system, an output image from the augmented image and the translated text, wherein the output image depicts the real-world scene with the translated text at the text location. The method includes providing, by the computing system, the output image for display to a user.

Another example aspect of the present disclosure is directed to a computing system to perform augmented reality translation. The computing system comprises one or more computing devices configured to perform operations. The operations include receiving, by the computing system, an input image, wherein the input image depicts a real-world scene that includes real-world text at a text location. The operations include processing, by the computing system, at least a portion of the input image with a machine-learned generative model to generate an augmented image, wherein the augmented image depicts the real-world scene with the real-world text removed. The operations include obtaining, by the computing system, translated text, wherein the translated text corresponds a translation of the real-world text into a different language. The operations include generating, by the computing system, an output image from the augmented image and the translated text, wherein the output image depicts the real-world scene with the translated text at the text location. The operations include providing, by the computing system, the output image for display to a user.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
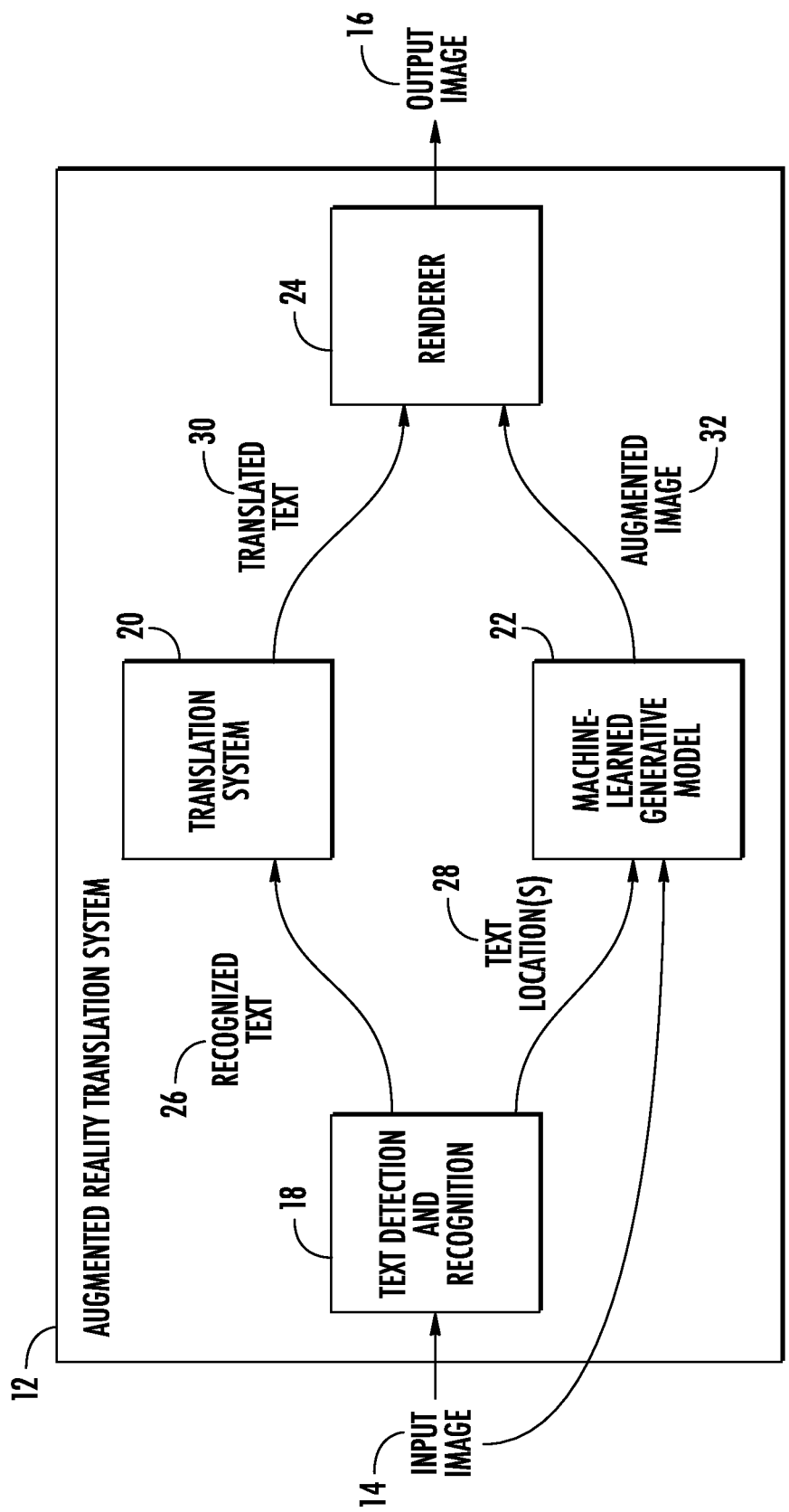
FIG. 1 depicts a block diagram of an example augmented reality translation system according to example embodiments of the present disclosure.

Reference numerals that are repeated across plural figures are intended to identify the same features in various implementations.

DETAILED DESCRIPTION

Generally, the present disclosure is directed to systems and methods that use generative models (e.g., generative adversarial networks) to enable photorealistic text inpainting in augmented reality. One example application of the proposed systems is to perform augmented reality translation. For example, a user can operate an image capture device (e.g., camera, smartphone, etc.) to capture imagery of a real-world scene that includes real-world text (e.g., signage, restaurant menus, etc.). The real-world text can be translated into a different language. Further, according to an aspect of the present disclosure, the captured imagery can be processed with a machine-learned generative model to produce an augmented image. The augmented image can depict the real-world scene with the real-world text removed. Specifically, because a machine-learned generative model is used, the augmented image can appear significantly more realistic, for example versus an image in which the real-world text has simply been blocked using a box with a single color. The translated text can be combined with the augmented image to generate an output image that depicts the real-world scene including the translated text. The output image can be provided for display to the user (e.g., within a viewfinder interface of a camera-enabled application), thereby providing an augmented reality experience that includes translation of real-world text.

The systems and methods of the present disclosure provide a number of technical effects and benefits. As one example, through the use of machine-learned generative models, the proposed techniques can provide for a more realistic and immersive augmented reality experience. Specifically, the machine-learned generative models are able to generate augmented imagery in which the real-world text has been removed, but which remain significantly more realistic or visually accurate versus more naive text-removal or blocking techniques. For example, the machine-learned generative models can be particularly trained to remove text from imagery and replace or ("inpaint") a very realistic, consistent, and accurate background in place of the removed text. Therefore, the use of the machine-learned generative models can result in final imagery that is far more true to the actual real-world background, while also including the translated text, thereby providing a more immersive augmented reality experience. This also has the effect of not blocking useful content in the image such as content included in labelled diagrams, maps, etc. which may have text to be translated. As another example technical effect and benefit, through the use of machine-learned generative models, for example as opposed to brittle handcrafted algorithms, the proposed approaches can be more robust against changes in camera pose, lighting, or other dynamic changes to the scene. This can result in a more consistent and immersive user experience.

With reference now to the Figures, example embodiments of the present disclosure will be discussed in further detail.

FIG. 1 depicts a block diagram of an example augmented reality translation system 12 according to example embodiments of the present disclosure. The augmented reality translation system 12 can receive an input image 14. The input image can depict a real-world scene that includes real-world text at a text location. For example, the scene can include a sign that includes text on the sign. As another example, the scene can include a physical document (e.g., menu, form, newspaper, receipt, etc.) that includes text on the physical document.

Further, although aspects of the present disclosure are described with reference to real-world imagery that depicts a real-world scene, they could also be applied to virtual or synthetic imagery that depicts a virtual or synthetic scene. As one example, the proposed approaches could be applied to a virtual camera (e.g., a virtual camera in a video game or other virtual world) to perform translation of textual content rendered or otherwise included within the virtual or synthetic scene.

In some implementations, the input image 14 can be an image captured by a user with an image capture device (e.g., camera, smartphone, etc.). For example, a user device (e.g., smartphone, tablet, etc.) can include one or more applications that are camera-enabled. As an example, the application can be a dedicated camera application. In other examples, various applications may include an interface that allows a user to capture imagery (e.g., by calling to the dedicated camera application, or otherwise). When facilitating the user to capture imagery, the application(s) can provide a viewfinder interface, where the viewfinder interface generally depicts a field of view of the camera in real-time (e.g., displays in the interface the current field of view of the camera).

The augmented reality translation system 12 can include a text detection and recognition system 18. The text detection and recognition system 18 can detect and recognize the text within the input image 14. As examples, the text detection and recognition system 18 can include various components or perform various techniques such as line detection, script identification, optical character recognition, inferring text structure (e.g., "paragraphing"), etc. These tasks can be performed using traditional approaches or using machine-learning models such as, for example, text detection and/or recognition models.

Thus, the text detection and recognition system 18 can perform various techniques to generate a set of recognized text 26 and identification of one or more text locations 28. The recognized text 26 can be expressed using tokens, characters, and/or other text representations. The text locations 28 can be expressed as coordinate values (e.g., (x,y) values in pixel space), bounding boxes, extracted portions of the input image 14, and/or other formats. As another example, the text locations 28 can be used to generate a mask (e.g., a binary pixel-wise mask) that indicates location(s) of the input image 14 that include text.

As yet another example, the text locations 28 can be used to extract one or more subportions of the input image 14 that specifically depict the text (e.g., to the exclusion of portion(s) of the input image 14 that do not depict text). As examples, the plurality of subportions respectively correspond to a plurality of lines of text, a plurality of words of text, or a plurality of chunks of text. For example, portion(s) of the input image 14 that depict text can be broken into chunks that have a predefined size. Examples will be discussed in further detail with reference to FIG. 3.

Referring still to FIG. 1, the augmented reality translation system 12 can include a translation system 20. The translation system 20 can translate the recognized text 26 into translated text 30, where the translated text 30 corresponds to the recognized text 26 translated into a different language. The translation system 20 can include various components or perform various techniques such as lookup tables or machine learning models such as sequence-to-sequence translation models. In some examples, the translation system 20 can be executed or implemented by calling to an external translation service or server.

Figure 2:
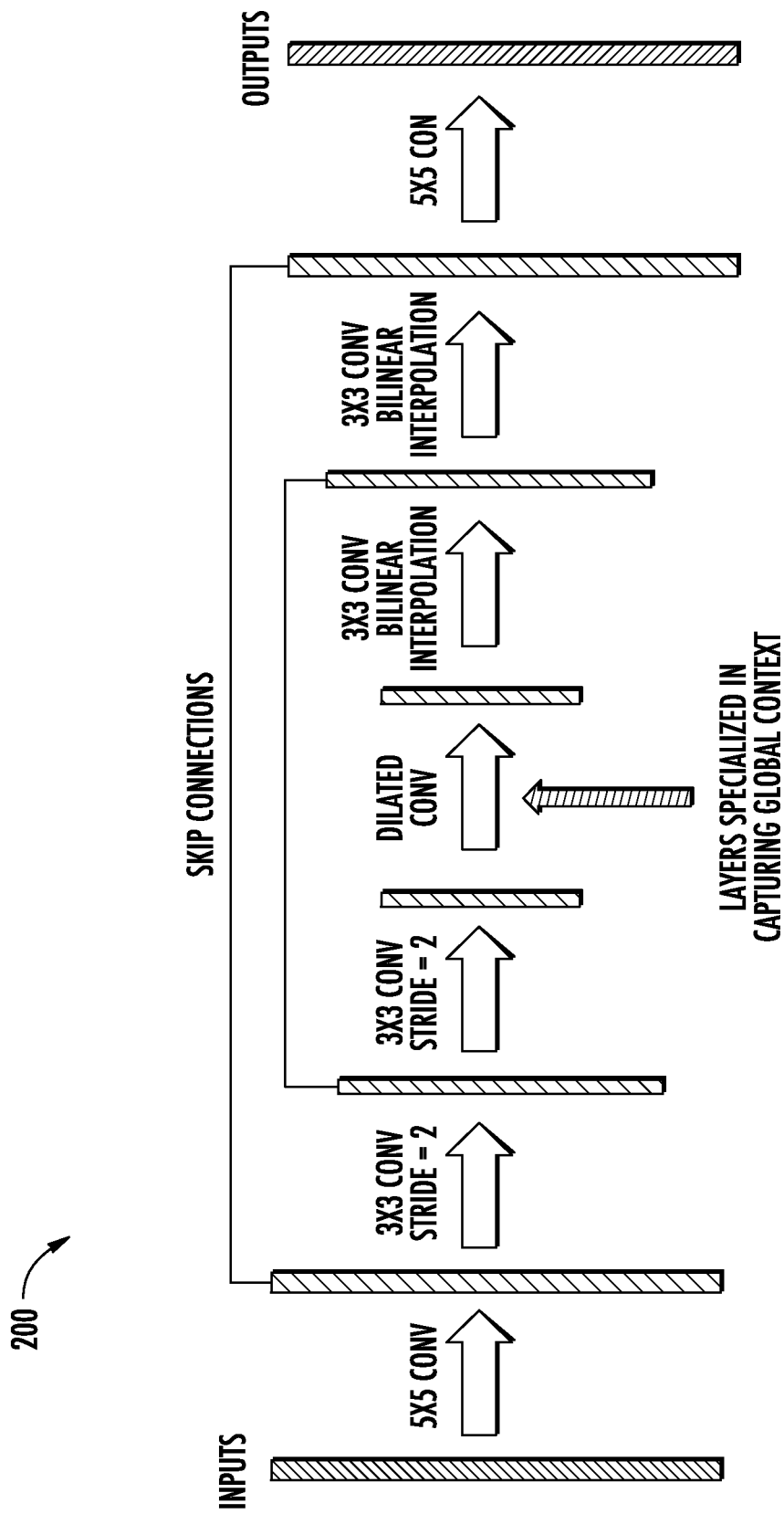
FIG. 2 depicts a block diagram of an example architecture of a generative model according to example embodiments of the present disclosure.
Figure 5:
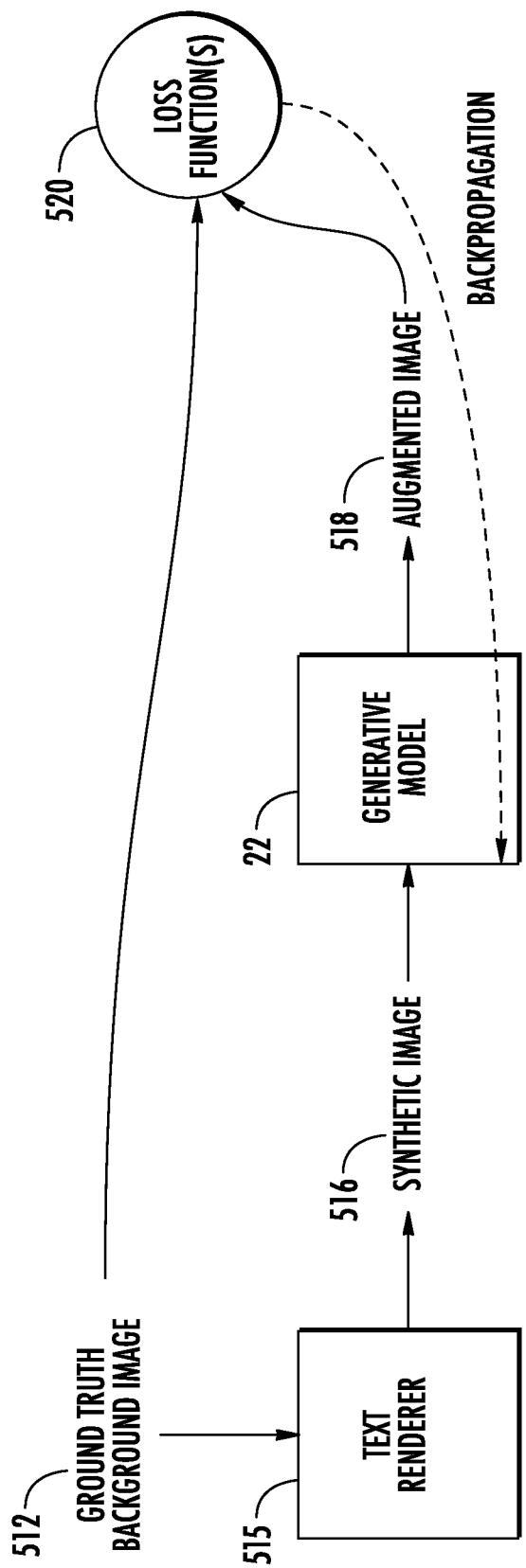
FIG. 5 depicts a block diagram of an example process to train a generative model according to example embodiments of the present disclosure.

According to an aspect of the present disclosure, the augmented reality translation system 12 can include a machine-learned generative model 22. The machine-learned generative model 22 can process at least a portion of the input image 14 to generate an augmented image 32. The augmented image 32 can depict the real-world scene with the real-world text removed (e.g., replaced or "inpainted" with an inferred or predicted background that realistically visually matches the remainder of the background of the real-world scene). In some implementations, the machine-learned generative model 22 can be a convolutional neural network. One example architecture is shown in FIG. 2. In some implementations, the machine-learned generative model 22 can be trained in an adversarial arrangement, and therefore can be referred to as a generative adversarial network (GAN). One example training approach is shown in FIG. 5.

Referring still to FIG. 1, in some implementations, the machine-learned generative model 22 can process an entirety of the input image 14 to generate the augmented image 32. In other implementations, the machine-learned generative model 22 can process one or more subportions of the input image 14 to generate the augmented image 32. For example, as described above, the text detection and recognition system 18 can detect one or more subportions of the input image 14 that depict the real-world text. The machine-learned generative model 22 can process the one or more subportions of the input image 14 to generate one or more augmented subportions. The augmented reality translation system 12 can replace the one or more subportions of the input image 14 with the one or more augmented subportions to generate the augmented image 32.

The augmented reality translation system 12 can generate an output image 16 from the augmented image 32 and the translated text 30. The output image 16 can depict the real-world scene with the translated text 30 at the text location(s) 28. As one example, the augmented reality translation system 12 can implement a renderer 24 to overlay the translated text 30 upon the augmented image 32 at the text location(s) 28. The renderer 24 may be provided with information about the text location(s) 28, attributes (e.g., color, font, etc.) of the real-world text in the input image 14, information about the camera pose/orientation, and/or other information that permits the output image 16 to have a similar look and feel to the input image 14 as regards the translated text 30. In another example, the renderer 24 may be a more complex model that performs generative text rendering.

The augmented reality translation system 12 (or other cooperative system) can provide the output image 16 for display to a user. For example, the output image 16 can be provided in a viewfinder interface of a camera-enabled application.

In some implementations, the augmented reality translation system 12 can operate iteratively and in real-time over a plurality of iterations. For example, the augmented reality translation system 12 can be executed while a user operates a camera-enabled application. While the application is opened, each image captured by the camera can be processed as shown in FIG. 1 to generate a respective output image. The output image can be provided in a viewfinder interface. In such fashion, a real-time augmented reality experience can be provided. In other implementations, rather than running on each individual image captured by the camera, the proposed approach can be implemented on only selected key frames (e.g., determined by motion, blurriness, etc.). The augmented images can then be tracked and overlaid in the correct position on the live camera feed until the next frame is selected. Adjustments can be made to, for example, brightness of the augmented images by measuring changes relative to neighboring pixels at time of frame selection. Alternatively or additionally, the augmented reality translation system 12 can operate "postcapture" (that is, at some time after an image has been captured and not in real-time).

The augmented reality translation system 12 can be implemented in whole in part at the user device, at server device(s), or at a mix of the user device and the server device(s).

FIG. 2 depicts a block diagram of an example architecture 200 of a generative model according to example embodiments of the present disclosure. The architecture 200 is provided as one example; many other architectures are possible.

As shown in FIG. 2, the example architecture 200 forms an encoder-decoder structure. To reduce the latency, the architecture 200 can include special mobile-friendly convolutional heads (e.g., MobileNetV1 and/or MobileNetV2 convolutional blocks or layers). Further, to increase the flow between distant layers, the architecture 200 can include skip connections. Further, the architecture 200 can include dilated convolutional layers in the middle of the bottleneck part of the network, enabling the model to capture the global context.

Figure 3:
FIG. 3 depicts a graphical diagram of example image subportions according to example embodiments of the present disclosure.
Figure 3:
Figure 3:
Figure 3:
Figure 3:
Figure 3:
Figure 3:
Figure 3:
Figure 3:
Figure 3:
Figure 3:
Figure 3:

FIG. 3 depicts a graphical diagram of example image subportions according to example embodiments of the present disclosure. In particular, in some implementations, the generative model can process the whole image (e.g., with bounding boxes of optical character recognition lines also provided to the model). However, in other implementations, the generative model can process subportions of the input image. For example, each subportion can be processed separately and/or in parallel by the model.

In one example, lines of text can be segmented into fixed-sized chunks and then passed into the model in one batch. In other examples, each subportion can correspond to a single word. In yet another example, each subportion can correspond to a full line of text.

FIG. 3 depicts one example of the chunking process. Specifically, FIG. 3 depicts the results of various image processing and inpainting operations. First, the input image can be resized proportionally to the specified fixed target height.

Next, line images can be extracted and pre-processed (e.g., rotated). Each line bounding box can be padded with the specified horizontal and vertical padding. Then, each line image from the input image can be cropped using its bounding box and rectify it (text lines can be rotated). Each line's height can then be clamped by the minimum and maximum allowed line height and the line can be rescaled proportionally if needed. As one example, 302 shows an unpadded input line; while 304 shows an input line that has been padded.

Next, a flat list of line chunks can be extracted from the line images. As one example, 306 shows input line chunks derived from the padded input line 304.

Each line chunk can then be processed ("inpainted") with the generative model to generate an output or augmented chunk. As an example, 308 shows the augmented chunks generated by the generative model from the input chunks 306. In some implementations, line chunks can be grouped by their size (e.g., width and height). This will ensure that the model processes chunks of the same size together or one after the other and prevents unnecessary memory reallocation. In some implementations, each group of line chunks can be sent to and processed by the generative model in batches.

Finally, the line images can be restored from the inpainted line chunks and the line images can be unpadded. As an example, 310 shows an unpadded output line generated from the output line chunks 308. Finally, the line images can be returned back to the inpainting primitive. As an example, 312 shows a padded output line generated from the unpadded output line 310. The padded output line 312 can be inserted into or otherwise combined with the original input image.

Figure 4C:
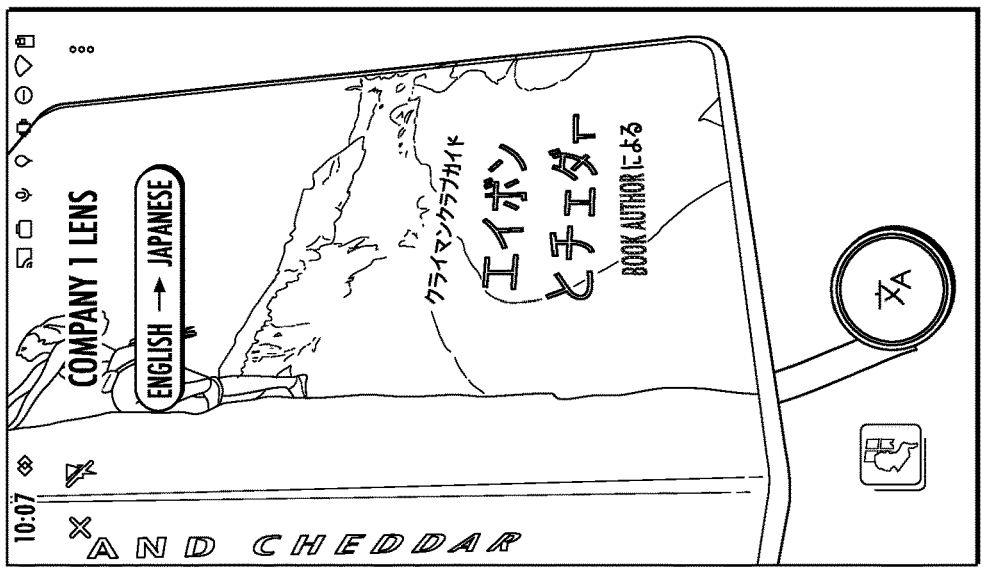
FIGS. 4A-C depict graphical diagrams of an example augmented reality translation according to example embodiments of the present disclosure.
Figure 4B:
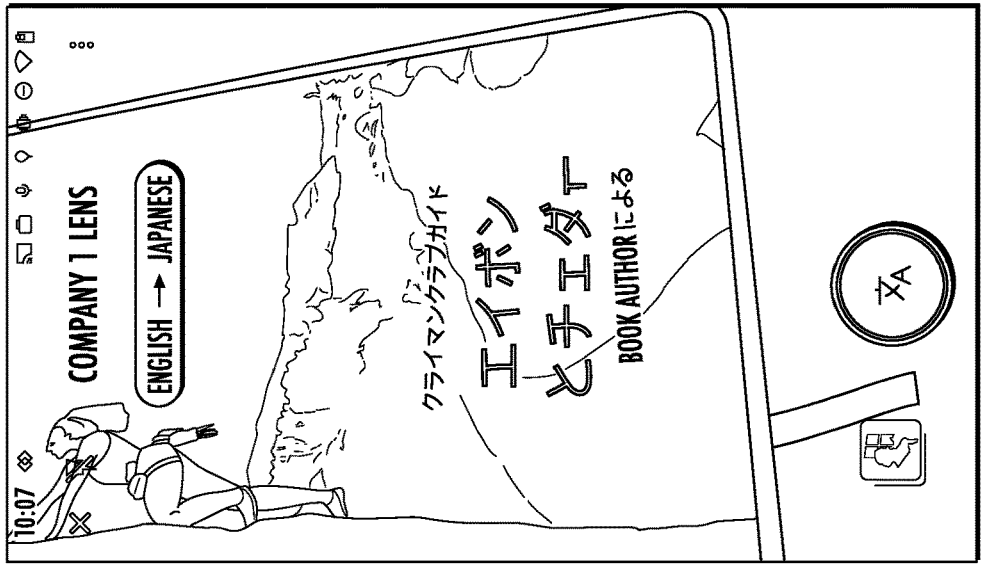
Figure 4A:
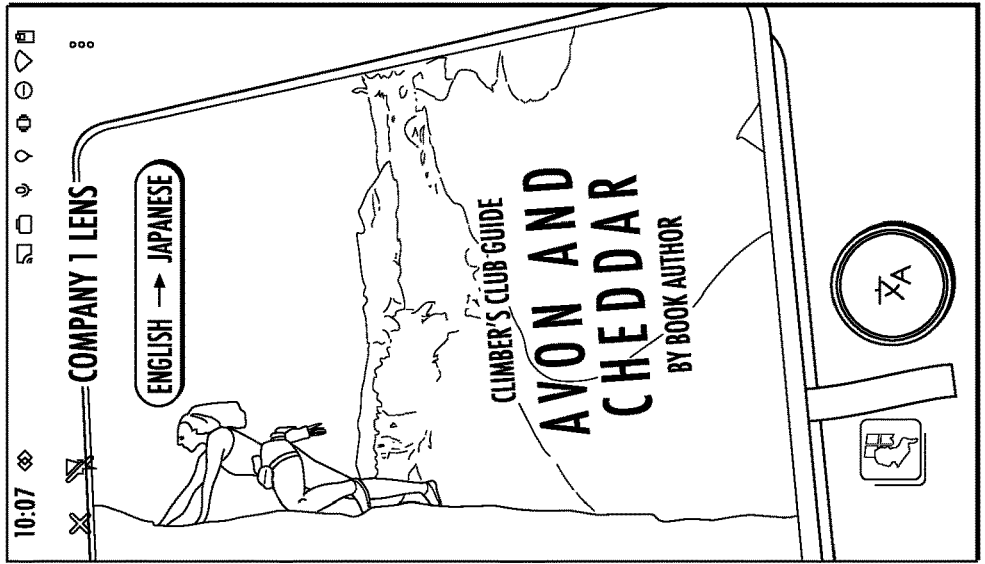

FIGS. 4A-C depict graphical diagrams of an example augmented reality translation according to example embodiments of the present disclosure. In particular, FIG. 4A shows an initial image captured by an image capture device. The image in FIG. 4A depicts a book that incudes real-world English language text on the cover.

FIG. 4B shows an output image in which the real-world English language text has been translated into Japanese language text on the cover of the book in an augmented reality fashion. As can be seen in FIG. 4B, aspects (e.g., coloring) of the background imagery (e.g., the cliffs and beach) is still retained behind the translated Japanese text (e.g., the cliffs and beach are still visible behind the Japanese text). This demonstrates an improvement of the present disclosure (e.g., versus systems that rely on single color blocks, blurring, or other techniques which do not retain the color and/or semantic content of the background imagery).

FIG. 4C shows that the augmented reality translation experience continues seamlessly despite a change in orientation of the camera relative to the scene (e.g., movement of the camera relative to the book). This demonstrates a benefit of the use of learned models by the present disclosure to provide a consistent output.

FIG. 5 depicts a block diagram of an example process to train a generative model according to example embodiments of the present disclosure. While a single training example is shown in FIG. 5, training can occur over a large number of training examples.

As illustrated in FIG. 5, the training process can start with a ground truth background image 512. For example, the ground truth background image 512 can depict a real-world scene that is free of text.

A text renderer 515 can be used to apply text onto the ground truth background image 512 to generate a synthetic image 516. The synthetic image 516 can depict a real-world scene that includes text.

The synthetic image 516 can be processed by the generative model 22 to generate an augmented image 518. One or more loss functions 520 can be used to evaluate the ground truth background image 512 and the augmented image 518.

As examples, the loss functions 520 can include a discriminator loss, one or more perceptual losses (e.g., a VGG19 perceptual loss, a ResNet perceptual loss, etc.), a feature matching loss, or other losses. The discriminator loss can use a discriminator model as an adversary to the generative model 22. An example discriminator loss is described at Goodfellow et al., Generative Adversarial Networks, arXiv:1406.2661. Example perceptual losses are described at Johnson et al., Perceptual Losses for Real-Time Style Transfer and Super-Resolution, arXiv:1603.08155.

Example feature matches losses are described at Salimans et al., Improved Techniques for Training GANs, arXiv: 1606.03498.

The loss function(s) 520 can be used to update parameter value(s) of the generative model 22. For example, the loss function(s) 520 can be backpropagated through the generative model 22 to update to the generative model 22.

Figure 6A:
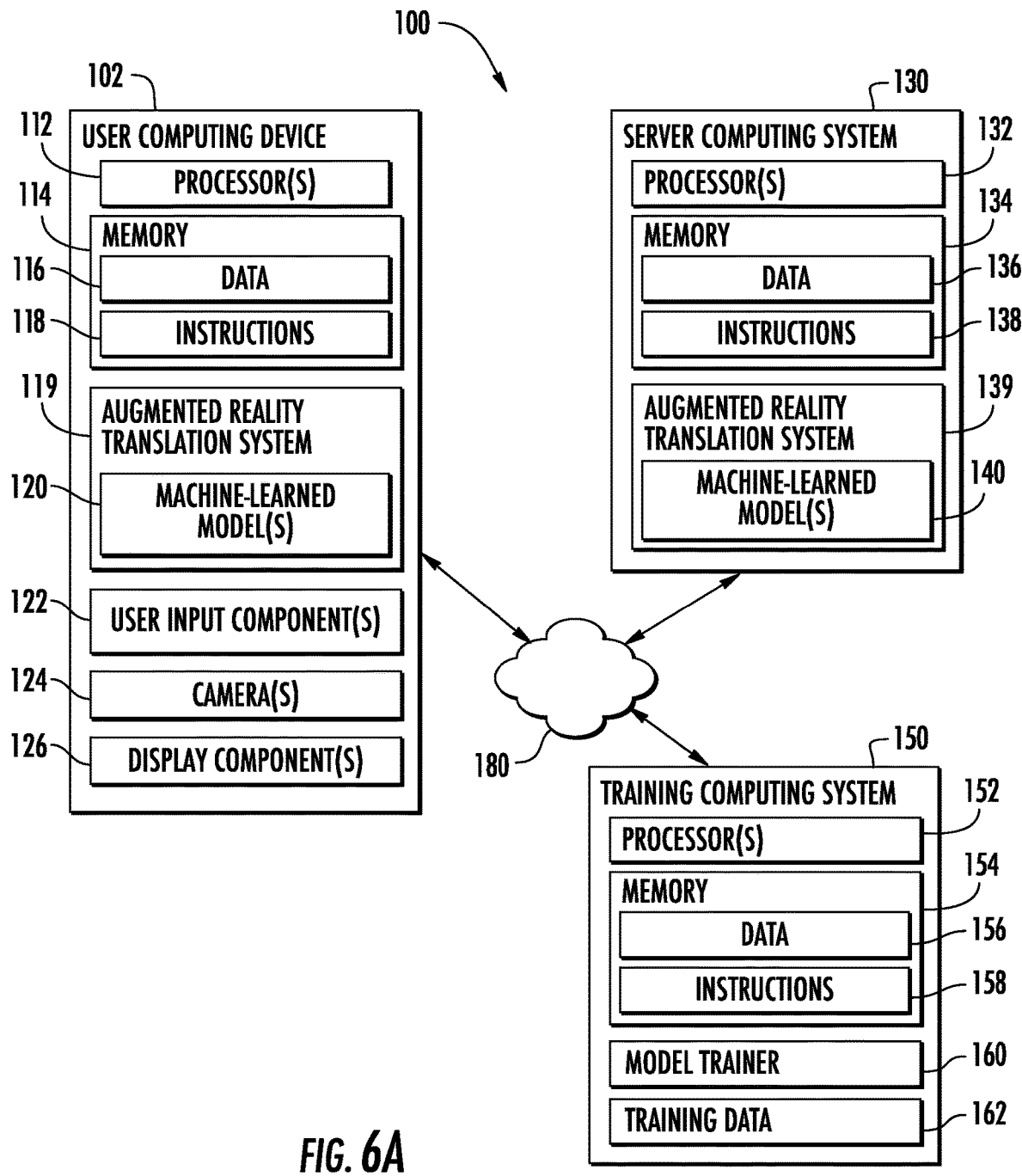
FIG. 6A depicts a block diagram of an example computing system that performs augmented reality translation according to example embodiments of the present disclosure.

FIG. 6A depicts a block diagram of an example computing system 100 that performs augmented reality translation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can include an augmented reality translation system 119. The augmented reality translation system 119 can be the same as or similar to the system 12 shown in FIG. 1.

The augmented reality translation system 119 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel augmented reality translation across multiple images).

Additionally or alternatively, the server computing system 130 can include an augmented reality translation system 139. The server computing system 130 can communicate with the user computing device 102 according to a client-server relationship.

The augmented reality translation system 139 can store or include one or more machine-learned models 140. For example, the machine-learned models 140 can be implemented by the server computing system 140 as a portion of a web service (e.g., an augmented reality translation service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The user computing device 102 includes one or more camera(s) 124. The camera(s) 124 can be any type of device or sensor for capturing imagery.

The user computing device 102 includes one or more display components 126. For example, the display components 126 can be various screens, projectors, or other components for outputting or displaying imagery or other content.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130. Alternatively, the models 120 and/or 140 can be trained independently by the training computing system 150 and then provided to the user computing device 102 and/or the server computing system 130 after training.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, tuples that include ground truth background images and synthetic images that depict text overlaid upon the ground truth background images.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 6A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 6B:
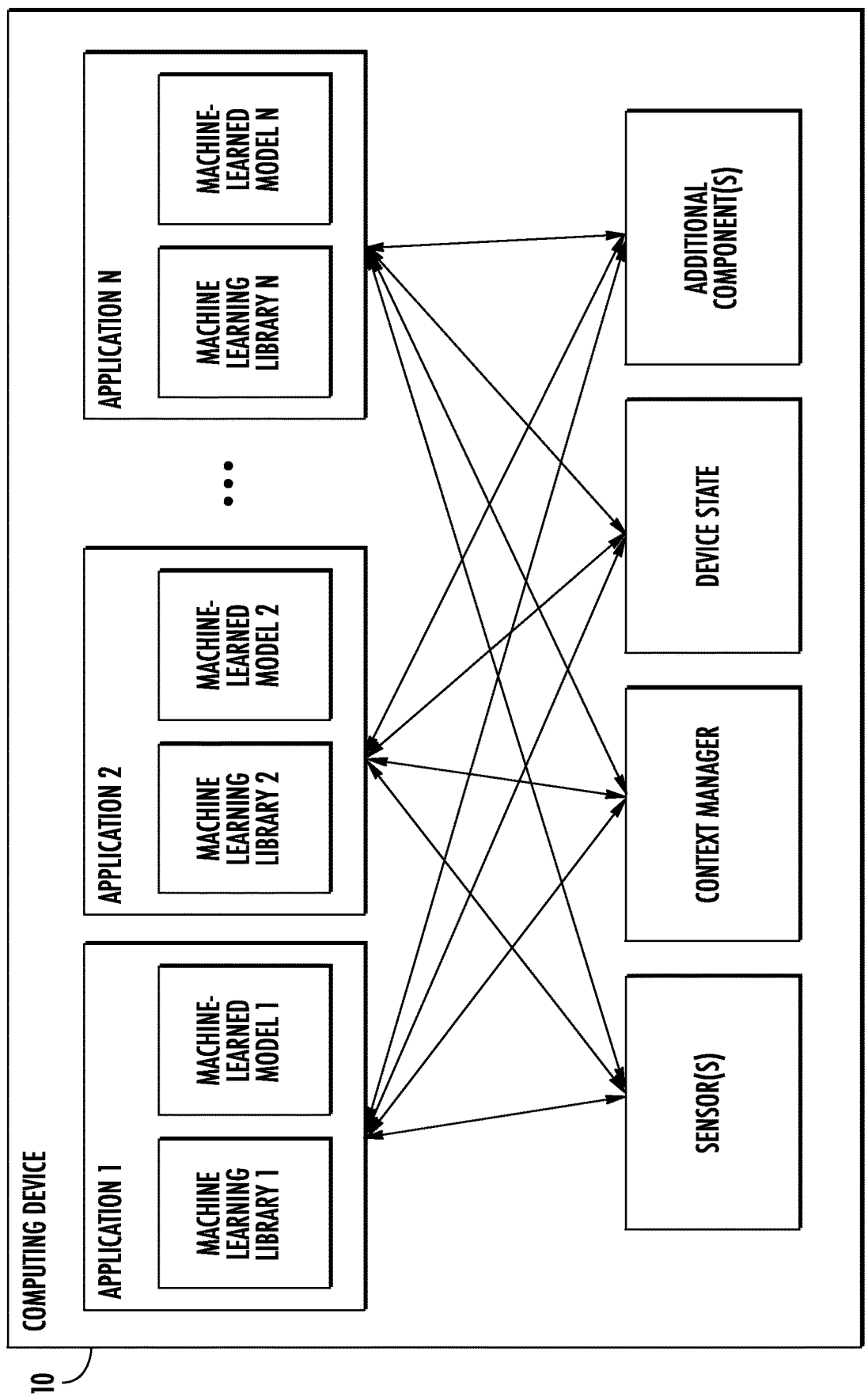
FIG. 6B depicts a block diagram of an example computing device according to example embodiments of the present disclosure.

FIG. 6B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
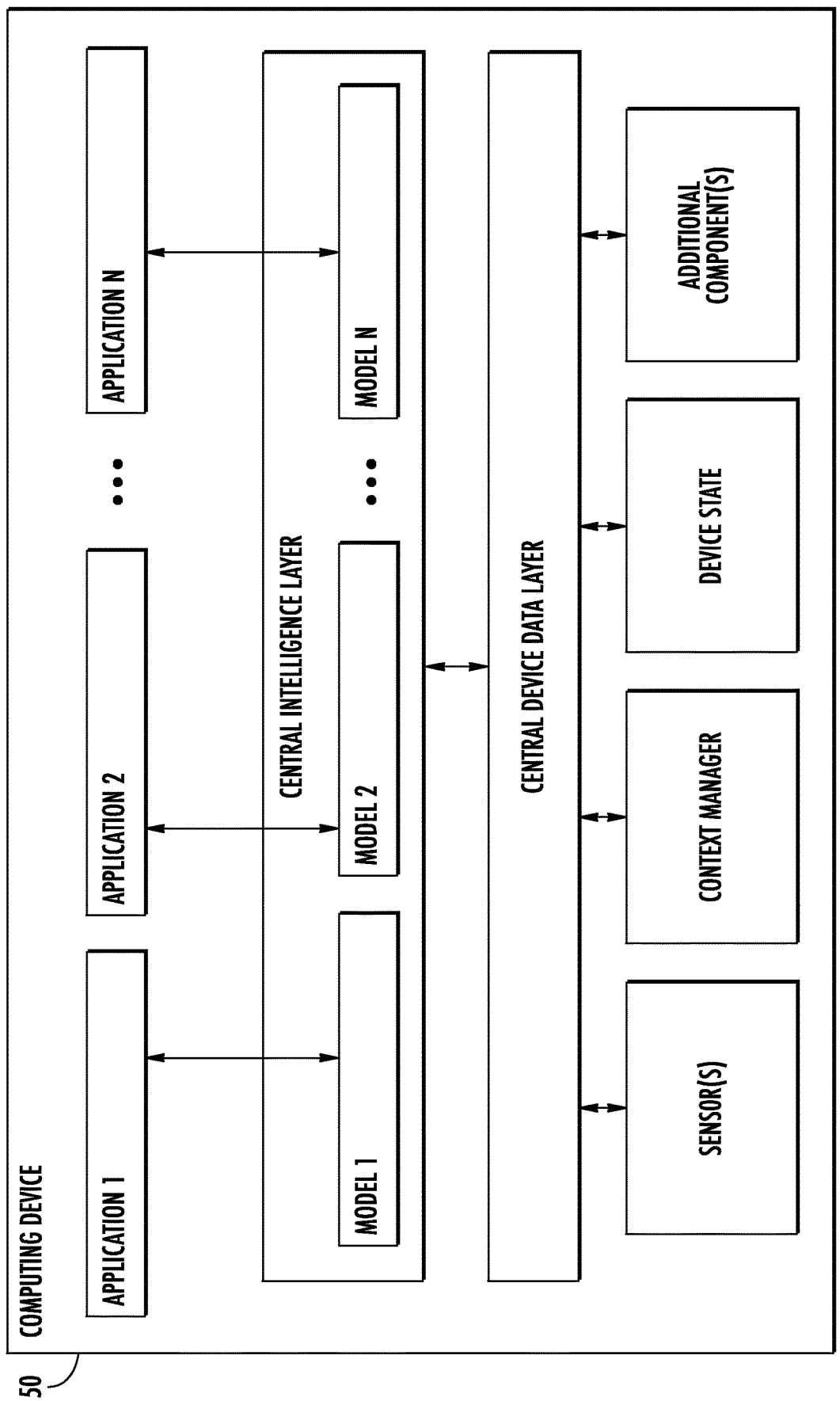
FIG. 6C depicts a block diagram of an example computing device according to example embodiments of the present disclosure.

FIG. 6C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform augmented reality translation, the method comprising:
   receiving, by a computing system comprising one or more computing devices, an input image, wherein the input image depicts a real-world scene comprising real-world text;
   processing, by the computing system, at least a portion of the input image with a machine-learned generative model to generate an augmented image, wherein the augmented image comprises a whole background of the input image being free of the real-world text for depiction of translated text;
   obtaining, by the computing system, the translated text, wherein the translated text corresponds a translation of the real-world text into a different language;
   generating, by the computing system, an output image from the augmented image and the translated text, wherein the output image depicts the real-world scene with the translated text instead of the real-world text; and
   providing, by the computing system, the output image for display to a user.

2. The computer-implemented method of claim 1, wherein:
   the input image comprises an initial background and depicts the real-world text in the initial background;
   processing, by the computing system, at least the portion of the input image with the machine-learned generative model to generate the augmented image comprises processing, by the computing system, an entirety of the input image with the machine-learned generative model to generate the augmented image that comprises the whole background; and
   generating, by the computing system, the output image comprises generating, by the computing system and from the augmented image and the translated text, the output image that comprises a new background and depicts the translated text in the new background.

3. The computer-implemented method of claim 1, wherein processing, by the computing system, at least the portion of the input image with the machine-learned generative model to generate the augmented image comprises:
   detecting, by the computing system, one or more subportions of an initial background of the input image that depict the real-world text;
   processing, by the computing system, the one or more subportions of the initial background of the input image with the machine-learned generative model to generate one or more augmented subportions of a new background; and
   replacing, by the computing system, the real-world text in the one or more subportions of the initial background of the input image with the translated text in the one or more augmented subportions of the new background to generate the output image.

4. The computer-implemented method of claim 3, wherein detecting, by the computing system, the one or more subportions of the initial background of the input image that depict the real-world text comprises extracting, by the computing system, a plurality of subportions of the initial background of the input image that depict the real-world text, wherein the plurality of subportions respectively correspond to a plurality of lines of text, a plurality of words of text, or a plurality of chunks of text that have a predefined size.

5. The computer-implemented method of claim 1, wherein generating, by the computing system, the output image from the augmented image and the translated text comprises overlaying, by the computing system, the translated text upon the augmented image.

6. The computer-implemented method of claim 1, wherein the method is performed iteratively and in real-time over a plurality of iterations.

7. The computer-implemented method of claim 1, wherein the machine-learned generative model comprises a generative adversarial network that has been trained using a discriminator model.

8. The computer-implemented method of claim 1, wherein:
   the machine-learned generative model has been trained using a plurality of training tuples;
   each training tuple comprises a corresponding ground truth background image and a corresponding synthetic image generated by overlaying text upon the ground truth background image;
   the machine-learned generative model has been trained with a loss function using the corresponding ground truth background image the corresponding synthetic image; and
   the loss function evaluates the ability of the machine-learned generative model to predict the corresponding ground truth background image and the corresponding synthetic image.

9. The computer-implemented method of claim 1, wherein:
   the computing system consists of a user computing device; and
   providing, by the computing system, the output image for display to the user comprises displaying, by the user computing device, the output image within a viewfinder interface of a camera-enabled application of the user computing device.

10. The computer-implemented method of claim 1, wherein the computing system consists of one or more server computing devices.

11. A computing system to perform augmented reality translation, the computing system comprising one or more computing devices configured to perform operations, the operations comprising:
   receiving, by the computing system, an input image, wherein the input image depicts a real-world scene comprising real-world text;
   processing, by the computing system, at least a portion of the input image with a machine-learned generative model to generate an augmented image, wherein the augmented image comprises a whole background of the input image being free of the real-world text for depiction of translated text;
   obtaining, by the computing system, the translated text, wherein the translated text corresponds a translation of the real-world text into a different language;
   generating, by the computing system, an output image from the augmented image and the translated text, wherein the output image depicts the real-world scene with the translated text instead of the real-world text; and
   providing, by the computing system, the output image for display to a user.

12. The computing system of claim 11, wherein:
   the input image comprises an initial background and depicts the real-world text in the initial background;
   processing, by the computing system, at least the portion of the input image with the machine-learned generative model to generate the augmented image comprises processing, by the computing system, an entirety of the input image with the machine-learned generative model to generate the augmented image that comprises the whole background; and
   generating, by the computing system, the output image comprises generating, by the computing system and from the augmented image and the translated text, the output image that comprises a new background and depicts the translated text in the new background.

13. The computing system of claim 11, wherein processing, by the computing system, at least the portion of the input image with the machine-learned generative model to generate the augmented image comprises:
   detecting, by the computing system, one or more subportions of an initial background of the input image that depict the real-world text;
   processing, by the computing system, the one or more subportions of the initial background of the input image with the machine-learned generative model to generate one or more augmented subportions of a new background; and
   replacing, by the computing system, the real-world text in the one or more subportions of the initial background of the input image with the translated text in the one or more augmented subportions of the new background to generate the output image.

14. The computing system of claim 13, wherein detecting, by the computing system, the one or more subportions of the initial background of the input image that depict the real-world text comprises extracting, by the computing system, a plurality of subportions of the initial background of the input image that depict the real-world text, wherein the plurality of subportions respectively correspond to a plurality of lines of text, a plurality of words of text, or a plurality of chunks of text that have a predefined size.

15. The computing system of claim 11, wherein generating, by the computing system, the output image from the augmented image and the translated text comprises overlaying, by the computing system, the translated text upon the augmented image.

16. The computing system of claim 11, wherein the method is performed iteratively and in real-time over a plurality of iterations.

17. The computing system of claim 11, wherein the machine-learned generative model comprises a generative adversarial network that has been trained using a discriminator model.

18. The computing system of claim 11, wherein:
the machine-learned generative model has been trained using a plurality of training tuples;
each training tuple comprises a corresponding ground truth background image and a corresponding synthetic image generated by overlaying text upon the ground truth background image;
the machine-learned generative model has been trained using a loss function the corresponding ground truth background image the corresponding synthetic image; and
the loss function evaluates the ability of the machine-learned generative model to predict the corresponding ground truth background image and the corresponding synthetic image.

19. The computing system of claim 11, wherein:
the computing system consists of a user computing device; and
providing, by the computing system, the output image for display to the user comprises displaying, by the user computing device, the output image within a viewfinder interface of a camera-enabled application of the user computing device.

20. The computing system of claim 11, wherein the computing system consists of one or more server computing devices.

* * * * *